(12) United States Patent
Facemire et al.

(10) Patent No.: US 7,984,106 B2
(45) Date of Patent: Jul. 19, 2011

(54) MESSAGING SYSTEM

(75) Inventors: Michael D. Facemire, Pittsboro, NC (US); Michael C. Wanderski, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/618,893

(22) Filed: Nov. 16, 2009

(65) Prior Publication Data
US 2011/0119192 A1 May 19, 2011

(51) Int. Cl.
G06F 15/16 (2006.01)
G06F 15/173 (2006.01)
(52) U.S. Cl. .................... 709/206; 709/207; 709/224
(58) Field of Classification Search .................. 709/224, 709/227, 206–207.224
See application file for complete search history.

(56) References Cited

U.S. PATENT DOCUMENTS

| 6,463,462 | B1 * | 10/2002 | Smith et al. | 709/206 |
|---|---|---|---|---|
| 6,650,739 | B1 * | 11/2003 | Doeberl et al. | 379/88.18 |
| 7,269,432 | B2 * | 9/2007 | Gress et al. | 455/466 |
| 7,461,378 | B2 * | 12/2008 | Beyda | 719/313 |
| 7,484,213 | B2 * | 1/2009 | Mathew et al. | 718/100 |
| 7,743,095 | B2 * | 6/2010 | Goldberg et al. | 709/203 |
| 2005/0223075 | A1 * | 10/2005 | Swearingen et al. | 709/207 |
| 2006/0004911 | A1 * | 1/2006 | Becker et al. | 709/207 |
| 2007/0143472 | A1 * | 6/2007 | Clark et al. | 709/224 |
| 2007/0165623 | A1 * | 7/2007 | Clark et al. | 370/389 |

* cited by examiner

Primary Examiner — Hussein A Elchanti
(74) Attorney, Agent, or Firm — A. Bruce Clay

(57) ABSTRACT

A message status bartering system is established in a peer-to-peer messaging environment. A message status is made available to a user of the peer-to-peer messaging environment. A bartering engine is used to determine whether an attempted communication with the user is to be allowed based on the message status in use. If the communication is disallowed, the bartering engine can be used to establish a bartering agreement between the parties.

20 Claims, 4 Drawing Sheets

MESSAGING SYSTEM

BACKGROUND

The present invention relates, in general, to messaging, and more specifically, to controlling presence awareness through bartering in a peer-to-peer messaging system.

Instant messaging (IM) is a collection of technologies that create the possibility of real-time text-based communication between two or more participants over the Internet or some form of internal network/intranet. IM allows effective and efficient communication, featuring immediate receipt of acknowledgment or reply. In certain cases Instant Messaging involves additional features, which make it even more popular, i.e., to be able to see the other party by using web-cams, or to talk directly over the Internet. It is also possible to save a conversation for later reference. Instant messages are typically logged into a local message history, which closes the gap with the persistent nature of e-mail, and facilitates quick exchange of information, including URLs or document snippets (which can be unwieldy when communicated via telephone).

It is common for users of IM (or other collaborative media) to manage their presence awareness status to help manage their time. Presence awareness indicates a user's current communication status. This published state informs others that wish to contact the user of his/her availability and willingness to communicate. The most common use of presence today is to display an indicator icon on IM clients, typically from a choice of graphic symbols with an easy-to-convey meaning, and a list of corresponding text descriptions of each of the states. For example, users may indicate when they are in meetings, when they should not be disturbed, etc. Instant messaging programs may provide a few defaults that are common for everyone, and then some customizable options to add additional features or to change the message associated with an existing status. However, deviating from the standard status in a business setting is not as useful, as it might be confusing, or prohibit productive collaboration. A user does not want to overuse the existing status messages since they can be taken out of context and misconstrued. For example, one does not want to use "away" when really present and working hard on something but do not want to be disturbed unless absolutely necessary. Additionally, one does not want to allow workers to always use a status such as "doing mission critical work, only bother me in emergencies" because it invites abuse, and to use it all the time is unwarranted.

BRIEF SUMMARY

According to one embodiment of the present invention, a method implements message status bartering in a peer-to-peer messaging system. By examining bartering rules with a bartering engine, it is determined whether to allow an attempted communication between a user and an interrupter. The bartering rules define options the user and the interrupter may barter for in exchange for allowing the attempted communication.

According to one embodiment of the present invention, a computer system implements message status bartering in a peer-to-peer messaging environment. A processor is programmed to examine bartering rules with a bartering engine. It is determined based upon the examination whether to allow an attempted communication between a user and an interrupter. The bartering rules define options the user and the interrupter may barter for in exchange for allowing the attempted communication.

According to one embodiment of the present invention, a computer program product implements message status bartering in a peer-to-peer messaging system. The computer program product comprises computer readable storage medium having computer readable program code embodied therewith. The computer readable program code comprises computer readable program code configured to determine by examining bartering rules with a bartering engine whether to allow an attempted communication between a user and an interrupter. The bartering rules define options the user and the interrupter may barter for in exchange for allowing the attempted communication.

DETAILED DESCRIPTION

Figure 1:
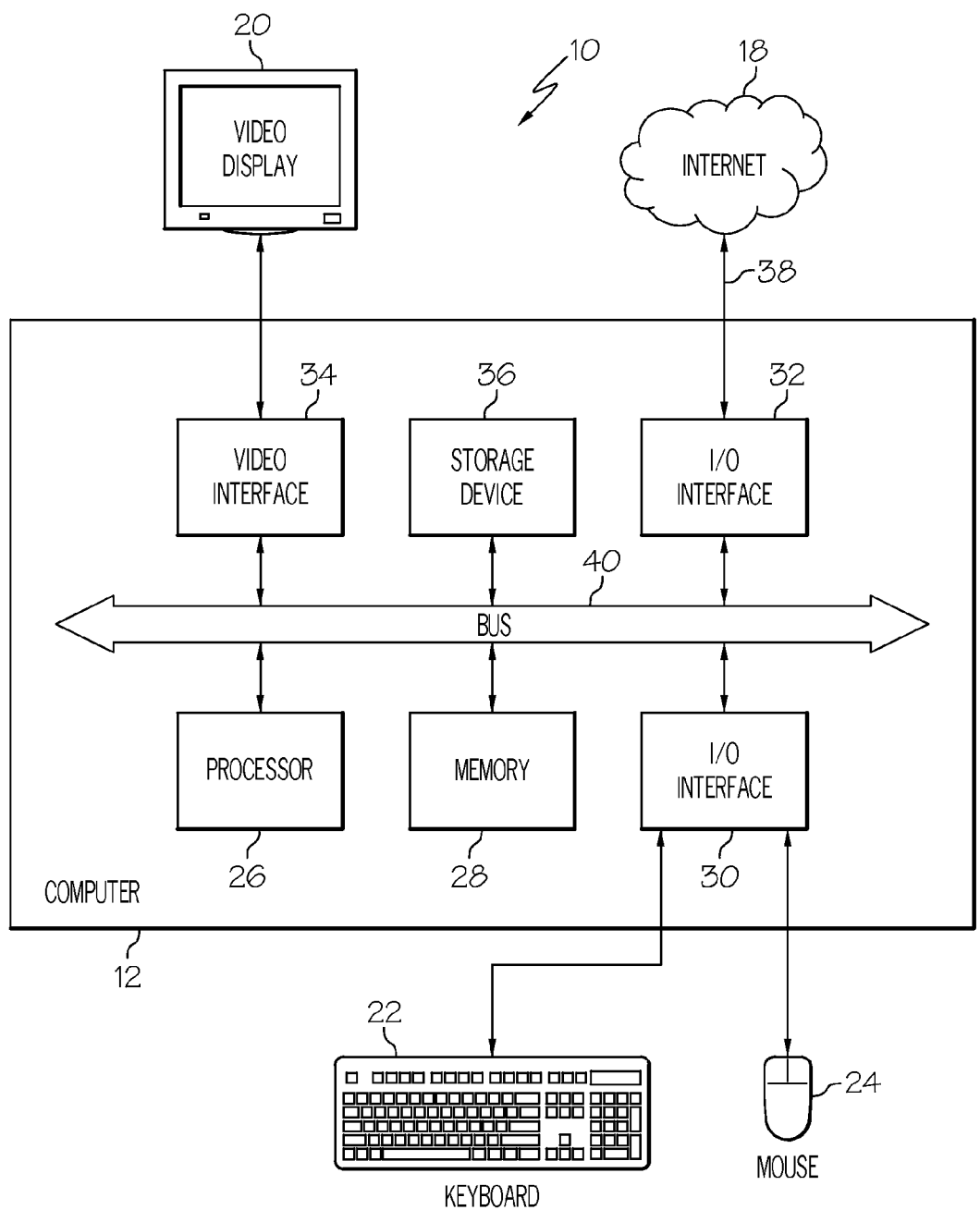
FIG. 1 is a hardware diagram that implements an embodiment of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer-usable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that can contain, store, communicate, propagate, or transport a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 is one example of a computer system 10 suitable for executing computer software for controlling presence awareness through bartering and policy control in a messaging system in accordance with the techniques described. Other processing devices which are suitable for executing the software can be a wireless telephone, personal assistant device (PDA), portable computer, smart remote control device, or any other processing devices that can execute such software.

The computer system 10 is of a type that executes under a suitable operating system installed on the computer system 10, and may be thought of as comprising software code for efficiently controlling presence awareness through bartering and policy control in a peer-to-peer messaging system. The components of the computer system 10 include a computer 12, a keyboard 22, mouse 24, and a video display 20. The computer 12 includes a processor 26, a memory 28, input/output (I/O) interfaces 30 and 32, a video interface 34, and a storage device 36.

The processor 26 is a central processing unit (CPU) that executes the operating system and the computer software executing under the operating system. The memory 28 includes random access memory (RAM) and read-only memory (ROM), and is used under direction of the processor 26.

The video interface 34 is connected to a video display 20 and provides video signals for display thereon. User input to operate the computer 12 is provided from the keyboard 22 and mouse 24. The storage device 36 can include a disk drive or any other suitable storage medium, as discussed above. Each of the components of the computer 12 is connected to an internal bus 40 that includes data, address, and control buses, to allow components of the computer 12 to communicate with each other via the bus 40. The computer system 10 can be connected to one or more other similar computers via an input/output (I/O) interface 32 using a communication channel 38 to a network, represented as the Internet 18.

The computer software may be recorded on a computer readable storage medium, in which case, the computer software program is accessed by the computer system 10 from the storage device 36. Alternatively, the computer software can be accessed directly from the Internet 18 by the computer 12. In either case, a user can interact with the computer system 10 using the keyboard 22 and mouse 24 to operate the programmed computer software executing on the computer 12.

In an embodiment of the invention, granular extensions are allowed for presence awareness status, including a mechanism for prohibiting abuse, such as manager involvement, while still promoting collaboration in a business environment. As will be subsequently discussed in greater detail in relation to FIG. 3, a manager can create a status that would be pertinent and more representative of what actual work is being done, how important it is, and who is doing it. Instead of the generic "I'm busy" status, it could be "I'm working on mission critical customer issues." Associated with this status could be a notification as to how accessible people are at that particular time, and how often they can use the status. If another party then attempts an interruption, a bartering engine could be used to determine if the person can be interrupted, and if so, what will be bartered in exchange (e.g., you interrupted me for ten minutes in mission critical time, I can now do the same to you without penalty). The issues and solutions described are immediately pertinent to business and personal communication programs available from various vendors.

Figure 2:
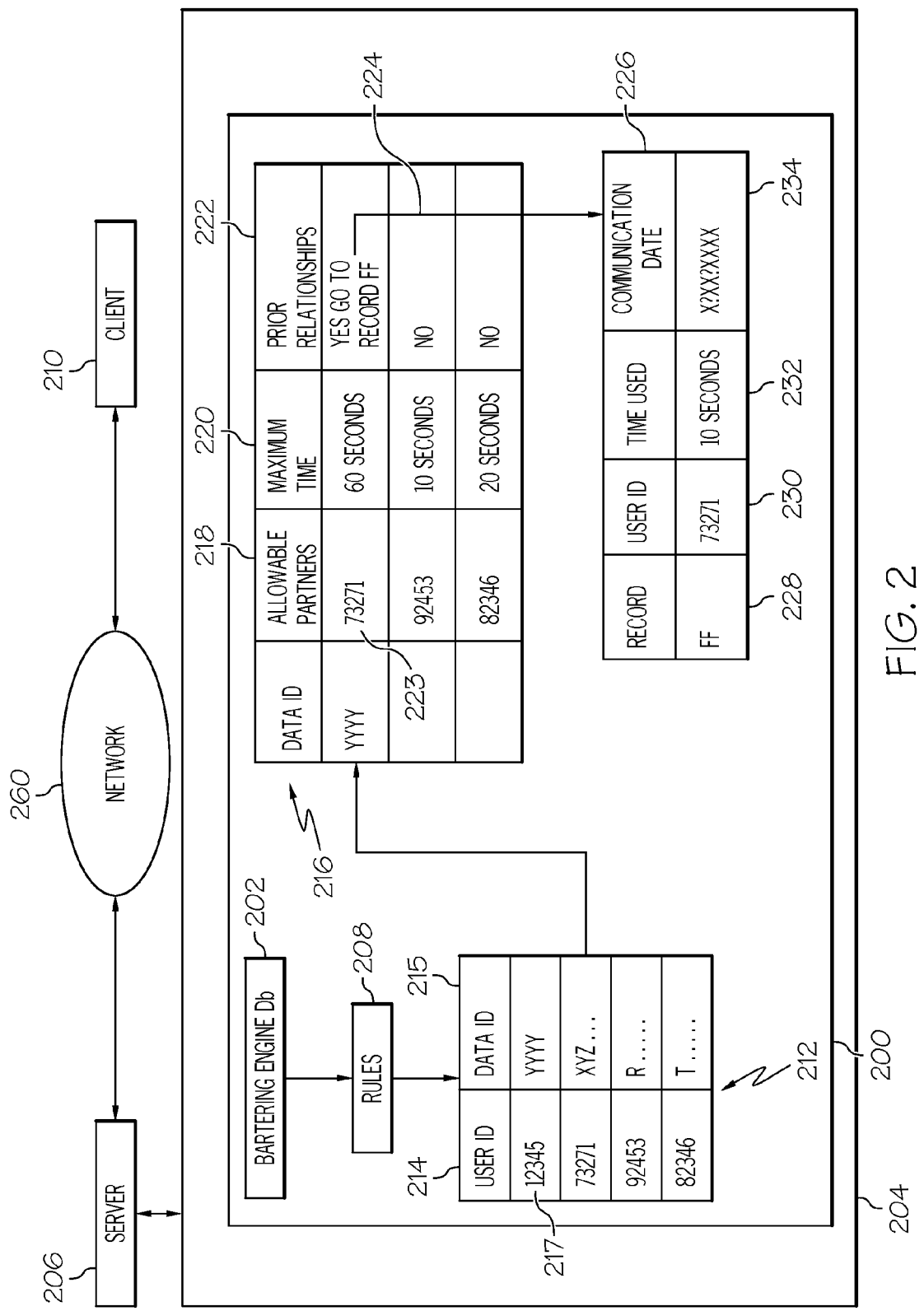
FIG. 2 is a bartering engine of an embodiment of the present invention.

Referring to FIG. 2, an embodiment of the present invention illustrates use of a bartering engine 200 implemented as a database 202. The bartering engine 200 is added to the overall system that is contained within a messaging infrastructure 204 on a server 206. The engine 200 can be "primed" with rules 208 defined by, for example, an administrator, a manager, or an individual user through a client 210 with information, such as, how much time a given user is willing to spend in a bartering transaction and an initial set of individuals that can enter into a time bartering session. The database 202 may comprise a schema 212 containing User ID's 214 and Data ID's 216, associated therewith.

As shown in FIG. 2, a User ID 217 may comprise a string of numbers to identify a specific user who represents the party to be interrupted. The Data ID 215 provides a reference to a Data Structure 216 associated with the username represented by the User ID 217. The Data Structure 216 may contain fields, for example, Allowable IM Partners 218, Maximum Allowable bartering time 220, and any prior bartering relationships 222. These db fields 218, 220, and 222 are relationally attached to a username of an IM partner, for example, IM Partner 223.

If there is a prior relationship between the user identified by User ID 217 and an allowable IM partner 223, a pointer to a record of the prior relationship will appear in the field 222. In this example, the pointer will lead (represented by an arrow 224) to a table 226. The table 226 may comprise a Record field 228, a User ID field 230, a Time Used field 232, and a Communication Date field 234. The table 226 shows that the IM Partner 223 has previously bartered with the user having User ID 217, how long the bartering took, and when the bartering occurred. Thus, the bartering engine 200 can conduct a database query against this data such that when an interrupting user attempts to barter for time with an interrupted user, the relational database can return the necessary information as to previous encounters and profile details which will then, at the server 206, allow or disallow the communication. While the bartering engine 200 is shown as part of the messaging infrastructure 204 of the server 206, it could be applied to the client 210.

In an embodiment of the invention, a predetermined regulating party (such as a manager, an administrator, or a user) provides an allocation of status messages based on policy control variables to other individuals (e.g., his/her employees). For example, if a manager knows that a particular employee is working on a high profile project, the manager can allocate 10 hours of "mission critical" status to the employee for the week that the employee can freely use to help manage interruptions during the day. This will indicate the intent of the status, so that colleagues and managers will understand the status and only interrupt the worker if absolutely necessary. It also prevents a worker from having to use an "away" message, or a "do not disturb" message which does not clearly define what the person is doing (and which can also have negative connotations). Since the allocation is controlled, it helps prevent abuse of the system by workers, as well as indicates to the manager when the employee is actively working on the project for which the allocation was made.

Figure 3:
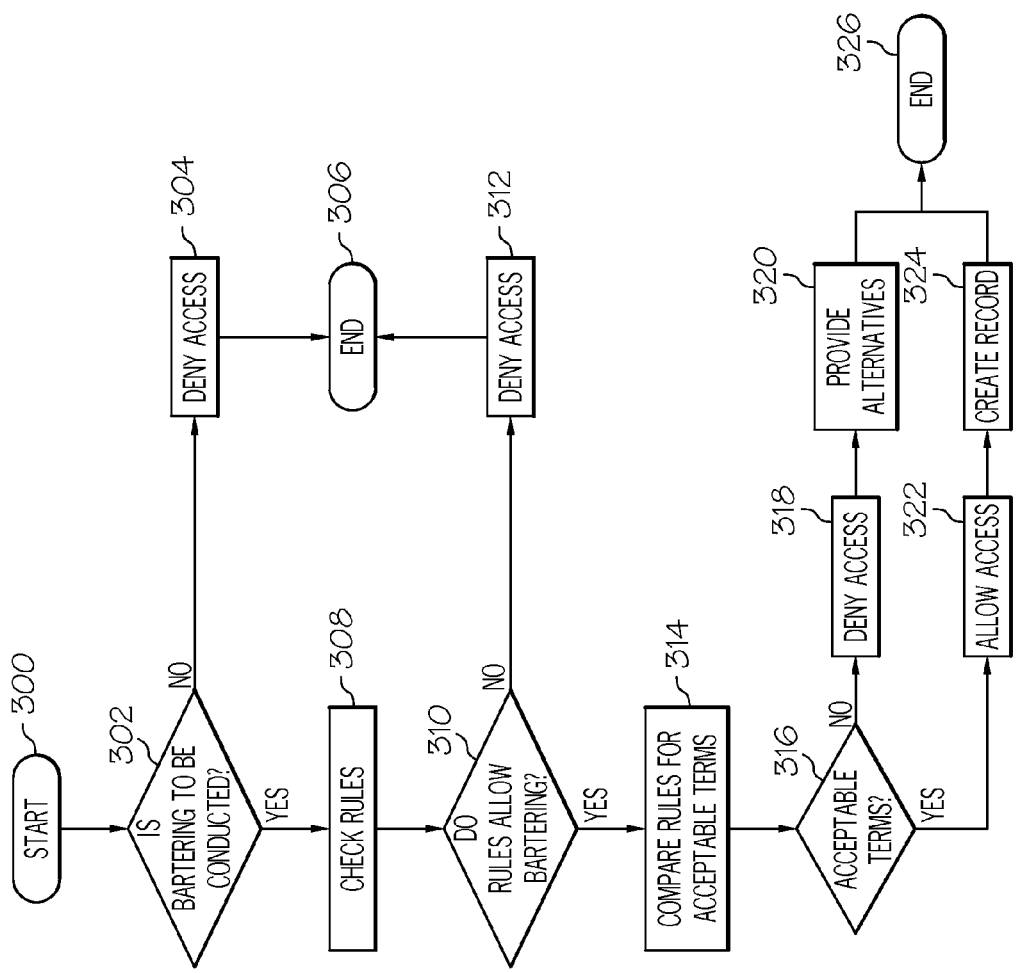
FIG. 3 is a flowchart of a bartering engine of an embodiment of the present invention.

As previously described above, an embodiment of the present invention includes a mechanism for the bartering of allocated status, such as the bartering engine 200 of FIG. 2. For example, if a user is in a designated "mission critical" status that includes constraints to how they may be interrupted, and another worker needed to communicate/interrupt them for an important event, the bartering system could be automatically invoked. Referring to FIG. 3, an embodiment of the present invention is illustrated as an example of invoking the bartering engine. The process starts at 300, and at decision block 302, it is determined whether bartering is to be conducted. If the response to decision block 302 is no, access is denied at block 304 and the process ends at block 306.

If the response to decision block 302 is yes, a check is made to see if there are predetermined rules at block 308, such as the rules 208 from FIG. 2. The rules 208 could include, for example, the interrupting user automatically giving the interrupted user the same right of interruption during a similar "mission critical" status. So, if user A interrupts user B during mission critical time, user B could be granted permission to freely interrupt user A during a similar mission critical time for user A. Thus, user B's later interruption of user A would be allowed, subject to the bartering system terms, without consequence (e.g. loss of ability to ping the person during that status). Thus, bartering would allow for a self regulating system which would serve to curtail abuse, as well as apply fairness within the system. The allocation, and the bartering of time, could also be controlled by policy settings to provide boundaries to the bartering system. For example, the worker could set a policy that says another co-worker can only interrupt them during "mission critical" if they have not already interrupted during this time, or have bartered enough in return.

At decision block 310, it is determined whether the predetermined rules allow bartering. If the response to decision block 310 is no, access is denied at block 312 and the system ends at block 306. If the response to decision block 310 is yes, the rules are evaluated and compared for both parties at block 314 to obtain acceptable terms for both parties.

At decision block 316, it is determined whether there are acceptable terms. If the response to decision block 316 is yes, access is allowed at block 322. At block 324, a record (table 226, FIG. 2) of the bartering is recorded for future bartering sessions and the system ends at block 326.

If the response to decision block 316 is no, access is denied at block 318. At block 320, a listing of alternative contact methods are provided to the interrupting user. Such alternatives might include: send email, contact my manager, or contact an assistant. The process then ends at block 326.

Figure 4:
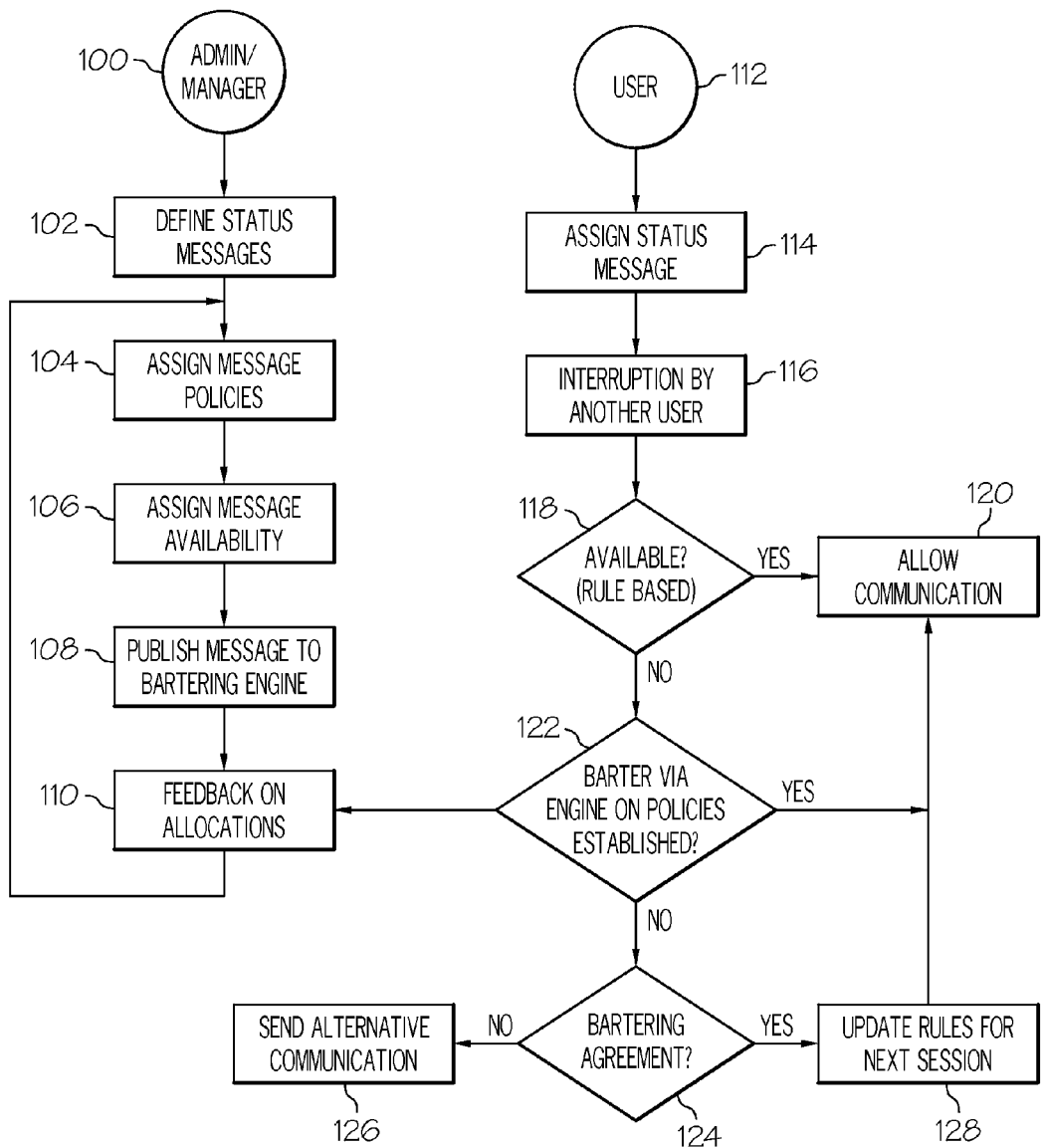
FIG. 4 illustrates a flowchart describing the process of an embodiment of the invention.

Referring to FIG. 4, a flowchart describes an embodiment of the invention. A predetermined regulating party (a manager, an administrator, or a user; hereinafter "manager") starts at 100. The manager establishes a set of status messages at block 102 to be made available for his/her group of personnel (e.g. employees) based on what would make sense in their environment. For example, the set of messages could include: "I am unavailable except for emergencies," or "I am away on mission critical business," or "I am unavailable until 6:00 PM."

For each status message, the manager then establishes/assigns a policy/rule (or set of policies/rules) at block 104 so that a decision can be made whether or not to allow a communication and what follow-up actions are to be taken. For example, a policy might state the urgency of a user's time while using that status message and how many hours, days, and/or times they can use that status. While time is used as a factor for establishing the definition of a policy/rule, it is to be understood that any criteria may be used.

Once the policies are established at block 104, the status messages are assigned to be available to one or more users at block 106. The manager can assign all messages to all personnel or selectively assign certain messages to certain personnel.

At block 108 the status messages and corresponding policies are published to the bartering engine to facilitate and control interruption over the peer-to-peer messaging system. Over time, feedback may be received by the bartering engine on the effectiveness of the bartering and be captured at block 110. Feedback mechanisms may include, for example, user comments, a survey at the completion of a bartering session, or automated mechanisms. An automated mechanism could comprise a record of how many times an interruption session began based on a previously bartered session. For example, if a set of users never take advantage of a previously negotiated bartering session (in which they were granted similar interruption for similar situations), the policies may need to be revised, as there may be too many one-time interruption sessions of key employees/resources. Similarly, if a set of users are constantly trading the same amount of time back-and-forth in a given time frame, it may indicate an abuse of the policies. Therefore, the policies may be dynamically updated to curtail these types of occurrences.

At block 112, a messaging client assigns their status message at block 114 from the pool of available messages assigned to them at block 106 by the manager. The assignment will depend upon the policies set for each message status, as described above. At block 116, another user attempts to communicate (or interrupt) with the user via the messaging client. At decision block 118, it is determined whether the user to be interrupted is available per the rule based policies established at block 104. If the response to block 118 is yes, the communication is allowed at block 120. For example, the user may have selected "I am available" as their status.

If the response to decision block 118 is no (user selected, for example, "I am on mission critical status and cannot be interrupted"), the process proceeds to decision block 122. At this point, the bartering engine 200 (FIG. 2) determines if, based on the user's current status, policies assigned to that status, and any previously established bartering rules from previous sessions, the user is available to communicate, and if so, allows that communication to happen at block 120. If there are issues to be resolved (user already has interrupted this user more than the allowed time via established policies) then the bartering engine 200 must determine if a bartering agreement can be established at decision block 124.

A bartering agreement may be conducted automatically based on rules (e.g., can I take 20 minutes of your time, and I will give you back 20 minutes of my time during a similar status message/priority). If a barter agreement can be reached at decision block 124, the result of that bartering agreement is recorded and updated at block 128 for use in subsequent sessions to establish or deny communication between the two users, and the communication is allowed at block 120. If a bartering agreement cannot be reached at decision block 124, alternative means of communication can be suggested at block 126 (e.g., send an email).

A more detailed example will be discussed with reference to the flowchart of FIG. 4. Assume an Organization A with two Departments B and C. Each department has its own manager, and each department provides similar services to Organization A that may require collaboration among members within each department and between each department. Organization A has provided an instant messaging system for all employees.

Each manager determines what, if any, status messages can be used by the members of their respective departments (block 102). This may include a set of default status messages and/or a set of customized messages.

For example, the manager of Department B provides all default messages (such as, "I am here;" "I am away;" "I am in a meeting") plus a customized status message ("Do not disturb unless urgent!"). Additionally, a user status of overriding importance can be granted such that when a user is granted the customized status message of "Do not disturb unless urgent!" any communication from that user to another user will so indicate. For example, when the user attempts to communicate with another member of Organization A, the status: "Mission critical information needed immediately, please respond!" could appear. The manager also defines a policy for this status message (block 104), such as, "if one must interrupt during "Do not disturb unless urgent!" status, no more than five minutes can be used." Other policies might include constraints on time of day or night, grant-back of similar rights, must contact manager, allowed if within the same department, and no exceptions allowed for outside departments.

The manager then assigns the customized status message (block 106) to members of Department B on an individual basis, depending upon need. For example, Department B has a deadline approaching on an important project. A member X of Department B is responsible for completing the project. The manager may grant member X use of the customized status, for example, until the project is completed, or for a certain number of hours. Once the authorized time has passed, the customized status is removed from member X's list of authorized availability, either manually or automatically.

The status messages and their corresponding policies are published to a bartering engine (block 108). This information is codified through an appropriate expressive implementation language, such as XML.

When members of Organization A set up their instant messaging, they will select a status message from the list for which they have been authorized to use. Continuing with the example, member X of Department B has selected the "Do not disturb unless urgent!" status message as authorized by the manager because he/she is working on the important project. While this status is in effect, a member Y of Department C wants to communicate with member X (block 116). Upon attempting the communication, the customized status message of "Do not disturb unless urgent!" will be received as a response from member X to member Y. Since this is a status indicating non-availability (block 118), the interruption is not allowed.

If member Y believes it is urgent to contact member X, a bartering session will be initiated (block 122). This could be as simple as an automatic response indicating: "If you have urgent business, you must grant equal time in a similar status." If acceptable, the communication would proceed. If an agreement is reached, it is recorded for future reference (block 128), and the two members would communicate. However, if no agreement is reached, member Y may be directed to contact member X through email rather than instant messaging. Additionally, there could be other options presented to member Y, such as, "Contact the manager of Department B," "Call me tomorrow," or any number of other possibilities that can be added into the instant messaging policies.

The corresponding structures, materials, acts, and equivalents of all functional elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for implementing message status bartering in a peer-to-peer messaging environment, comprising:
   establishing status messages that define a user's availability for an exchange of communication in the peer-to-peer messaging environment with an interrupter;
   displaying at least one of said status messages to said interrupter upon attempting to communicate with said user;
   establishing bartering rules that define whether said interrupter can override said status message by agreeing to conditions defined by said bartering rules; and
   examining said bartering rules with a bartering engine to determine whether to allow said attempted communication between said user and said interrupter, wherein said interrupter agrees to said conditions defined by said bartering rules in exchange for allowing said attempted communication.

2. The method of claim 1, wherein a predetermined third party establishes said status messages and said bartering rules for use by said user in the peer-to-peer messaging environment.

3. The method of claim 2, wherein said status messages define conditions under which said user is authorized to use said status message.

4. The method of claim 1, further comprising another status message to inform said interrupter that said user is not available without bartering.

5. The method of claim 1, further comprising:
   using said bartering engine to achieve a barter agreement between said user and said interrupter; and
   storing said barter agreement with said bartering rules.

6. The method of claim 5, further comprising accessing said stored barter agreement in a subsequent attempted communication between said user and said interrupter in order to determine any ongoing modifications to said bartering rules therebetween.

7. The method of claim 1, further comprising modifying said bartering rules with feedback.

8. The method of claim 7, further comprising requesting said feedback from said user and said interrupter subsequent to a bartering session therebetween.

9. A computer system for implementing message status bartering in a peer-to-peer messaging environment, comprising:
   a processor programmed to:
   establish status messages that define a user's availability for an exchange of communication in the peer-to-peer messaging environment with an interrupter;
   display at least one of said status messages to said interrupter upon attempting to communicate with said user;
   establish bartering rules that define whether said interrupter can override said status message by agreeing to conditions defined by said bartering rules; and
   examine said bartering rules with a bartering engine to determine whether to allow said attempted communication between said user and said interrupter, wherein said interrupter agrees to said conditions defined by said bartering rules in exchange for allowing said attempted communication.

10. The computer system of claim 9, wherein said processor is further programmed to establish with a predetermined third party status messages and said bartering rules for use by said user in the peer-to-peer messaging environment.

11. The computer system of claim 10, wherein said processor is further programmed to define conditions for said status messages under which said user is authorized to use said status messages.

12. The computer system of claim 9, wherein said processor is further programmed to inform said interrupter with another status message that said user is not available without bartering.

13. The computer system of claim 9, wherein said processor is further programmed to:
   use said bartering engine to achieve a barter agreement between said user and said interrupter; and
   store said barter agreement with said bartering rules.

14. The computer system of claim 9, wherein said processor is further programmed to modify said bartering rules with feedback.

15. A computer program product for implementing message status bartering in a peer-to-peer messaging environment, the computer program product comprising:
   a non-transitory computer readable storage medium having computer readable program code embodied therewith, the computer readable program code comprising:
   computer readable program code configured to establish status messages that define a user's availability for an exchange of communication in the peer-to-peer messaging environment with an interrupter;
   computer readable program code configured to display at least one of said status messages to said interrupter upon attempting to communicate with said user;
   computer readable program code configured to establish bartering rules that define whether said interrupter can override said status message by agreeing to conditions defined by said bartering rules; and computer readable program code configured to examine said bartering rules with a bartering engine to determine whether to allow said attempted communication between said user and said interrupter, wherein said interrupter agrees to said conditions defined by said bartering rules in exchange for allowing said attempted communication.

16. The computer program product of claim 15, further comprising computer readable program code configured to establish, with a predetermined third party status messages and said bartering rules for use by said user in the peer-to-peer messaging environment.

17. The computer program product of claim 16, further comprising computer readable program code configured to define conditions under which said status messages are authorized for use by said user.

18. The computer program product of claim 15, further comprising computer readable program code configured to inform said interrupter with another status message that said user is not available without bartering.

19. The computer program product of claim 15, further comprising computer readable program code configured to:

use said bartering engine to achieve a barter agreement between said user and said interrupter; and store said barter agreement with said bartering rules.

20. The computer program product of claim 15, further comprising computer readable program code configured to modify said bartering rules with feedback.

* * * * *